Oct. 23, 1962

D. C. WILLIAMS 3,060,003

PROCESS AND APPARATUS FOR PRODUCING CARBON BLACK

Filed July 16, 1959

INVENTOR
David C Williams
BY Walter H. Schneider
ATTORNEY

United States Patent Office 3,060,003
Patented Oct. 23, 1962

3,060,003
PROCESS AND APPARATUS FOR PRODUCING
CARBON BLACK
David C. Williams, Aransas Pass, Tex., assignor to United Carbon Company, Inc. (Maryland), Charleston, W. Va., a corporation of Maryland
Filed July 16, 1959, Ser. No. 827,477
10 Claims. (Cl. 23—209.4)

This invention relates to carbon black. More particularly, it relates to the preparation of carbon black. Still more particularly, it relates to a method and apparatus for producing carbon black by thermal decomposition of a hydrocarbon.

The preparation of furnace carbon black by partial combustion and/or thermal decomposition of a gaseous or liquid hydrocarbon is well-known. In general, this method of preparation is conducted by burning a hydrocarbon in the presence of a deficiency of oxygen so that the heat generated by partial combustion of the hydrocarbon will decompose the remainder of the hydrocarbon, and/or by subjecting a hydrocarbon to the heat generated by the substantially complete combustion of a second, and generally different, hydrocarbon. The hydrocarbon feedstock employed, the method of injection thereof as well as of combustion supporting gas and hydrocarbon fuel when employed, feed rates, reaction temperature, reaction time, and the like, are all variables which determine the grade of carbon black prepared as well as the quality of any particular grade. Considerable study of these variables has been conducted, much of which has been directed toward improving the method of injecting the hydrocarbon feedstock, the hydrocarbon fuel and the combustion supporting gas into the reactor. As a result, certain suggested modifications in the furnace process for preparing carbon black have been closely related to specific reactor designs.

One such modification provides for the injection of a hydrocarbon fuel and a combustion supporting gas therefor into a substantially tubular reactor in such a manner and at such a velocity as to cause the resultant mixture thereof as well as its products of combustion to follow a swirling path through the reactor. Another modification provides for the injection of the hydrocarbon fuel and/or the combustion supporting gas into the reactor parallel to the axis of the reactor in a manner so as to cause impingement thereof on exposed surfaces. In each of these modifications, a violently turbulent mixture of combustion products is obtained into which a hydrocarbon feedstock is introduced and rapidly decomposed. While these modifications have proved successful in the preparation of furnace blacks, nevertheless, they each suffer from certain disadvantages. One of these disadvantages is that the apparatus necessary to obtain the turbulent mixing is not only difficult but costly to fabricate.

In spite of the apparent success of these modifications to the furnace process, there has continued to remain a demand for an improved process of producing furnace black having the advantages of such modifications but which is not subject to the disadvantages thereof. It is a principal object of this invention, therefore, to provide such a process. It is particularly an object of this invention to provide such a process which may be conducted in a reactor of a design which is neither difficult nor costly to fabricate. A further object is to provide a process applicable to the preparation of various grades of furnace black preferably in a reactor which itself may be readily and simply adjusted to accommodate such varied preparations. It is a still further object of this invention to produce such varied grades of carbon black in good yield and high quality. A further object is to provide a process capable of being conducted in a reactor of a design permitting easy access to the interior thereof.

These objects have been met in a relatively simple yet surprisingly effective manner. In general, the process of this invention comprises injecting a hydrocarbon feedstock into a first or heating zone containing a flammable mixture injected thereinto as such or as its hydrocarbon fuel and combustion supporting gas components. This mixture and the combustion gases formed on ignition thereof are caused to follow a flow pattern which permits for complete oxidation of the hydrocarbon fuel without intimate contact of the mixture or its combustion products with the hydrocarbon feedstock. Upon substantially complete combustion of the hydrocarbon fuel, the resultant products of combustion and the hydrocarbon feedstock are brought together in such a manner as to cause rapid and thorough mixing as they are passed into a second or reaction zone, causing the feedstock to be brought to its cracking temperature. The reaction is terminated at a predetermined time, and the resultant carbon black-bearing gases subjected to further treatment to separate and collect carbon black.

Although the process of this invention may be conducted in any reactor of a configuration suitable to carry out the steps thereof, nevertheless, it can be more easily described and its advantages best appreciated by reference to a specific reactor design. For this purpose, therefore, the process of this invention will be further discussed in conjunction with the accompanying drawing in which:

FIGURE 3 is a transverse sectional view of the injector assembly taken on the line A—A of FIGURE 2.

Although the attached drawing illustrates a reactor found particularly suitable for use with the process of this invention, nevertheless, it is to be understood that the process may be conducted with reactors of other designs, and that while the reactor illustrated is a preferred embodiment of this invention, it is in no way intended to limit the process.

Figure 1:
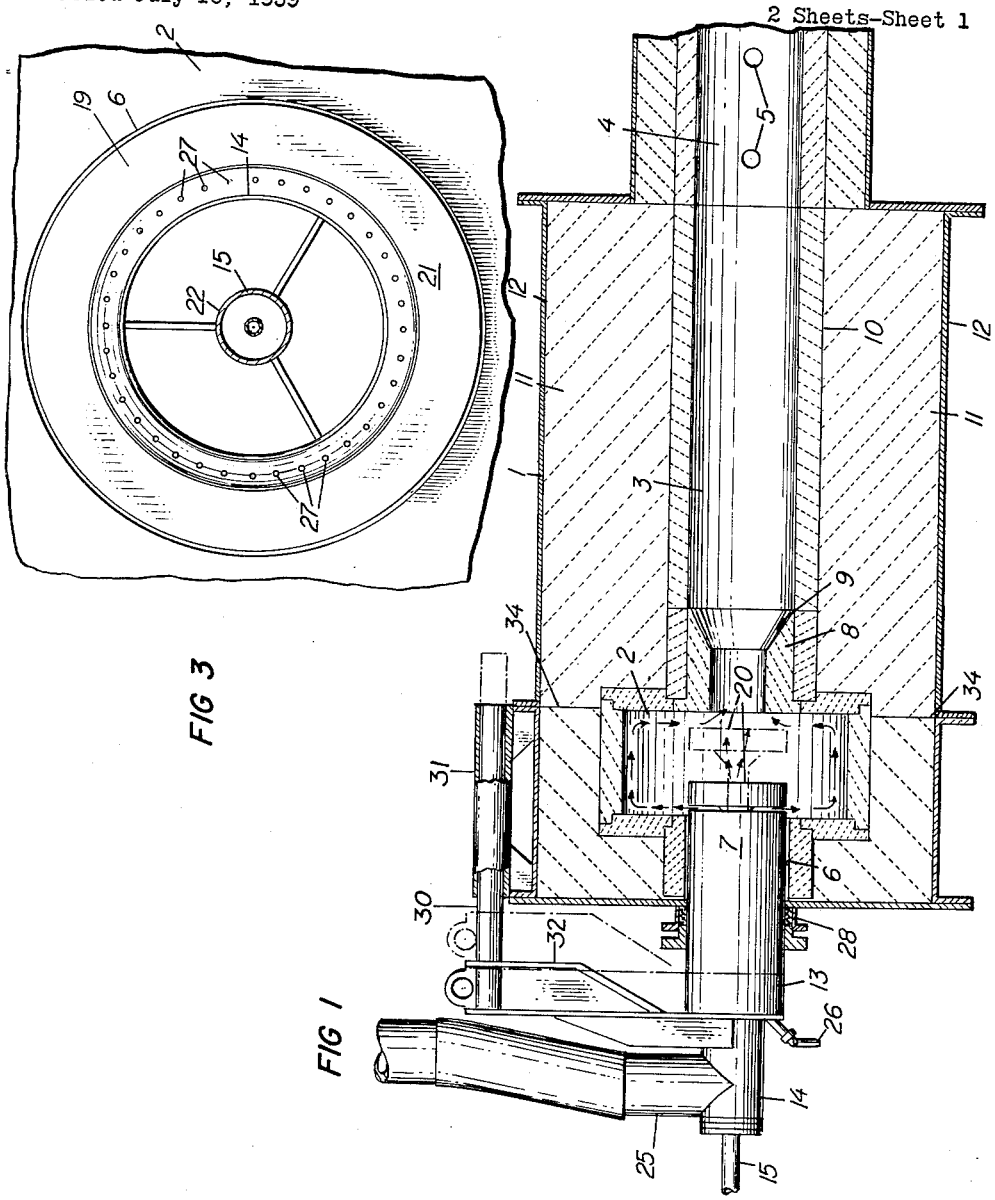
FIGURE 1 is a longitudinal sectional view of a reactor including the injector.

Referring now to FIGURE 1 of the drawing, reference numeral 1 denotes a generally tubular reactor which is divided as shown into a first or heating zone 2, a second or reaction zone 3 and a quench zone 4 having quench ports 5. As illustrated, the quench zone constitutes merely an extension of the reaction zone and is of substantially similar configuration. The heating zone, however, is of greater diameter and shorter length than the reaction zone. For optimum results, moreover, it is preferred that the diameter of the heating zone be greater than its length, although this is not a necessary limitation for operation of the method.

Heating zone 2 is provided with an inlet opening 6 through which injector assembly 7 projects thereinto, while quench zone 4 is provided with an outlet opening not shown for withdrawal of reaction products. Positioned in the inlet end of the reaction zone is a replaceable choke ring 8 of a high temperature refractory material having an orifice 9. The length and shape of orifice 9 may vary and will depend to some extent upon the particular grade of carbon black to be produced. The choke ring illustrated has an orifice whose initial diameter is less than that of the reaction zone but which subsequently gradually increases until it is substantially the same as that of the reaction zone. Each of the zones and their inlet and outlet orifices is formed by a high temperature refractory liner 10 backed up by a castable refractory insulation 11, the entire reactor in turn having an outer steel shell or casing 12.

Figure 2:
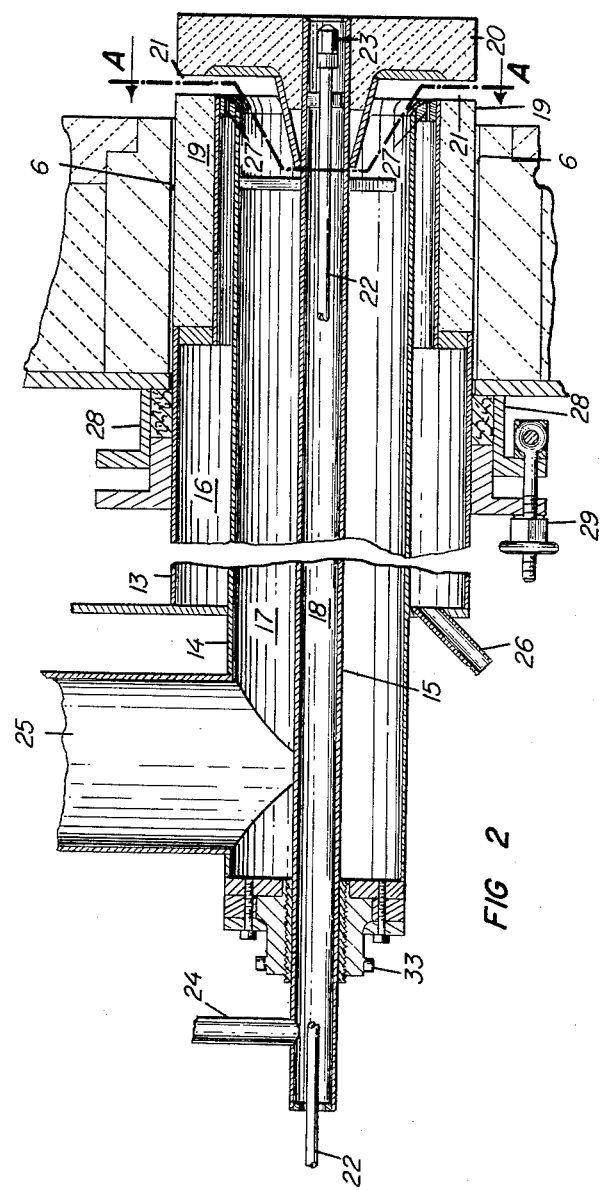
FIGURE 2 is an enlarged longitudinal sectional view of the injector assembly in detail.

As more fully shown in FIGURE 2, injector assembly 7 is composed of substantially concentric tubular members 13, 14 and 15 forming passageways 16, 17 and 18. That portion of tubular member 13 extending into opening 6 and heating zone 2 is recessed to receive a heat resistant refractory insert 19, while a gas distribution plate, more fully described hereafter, is inserted between the inner ends of members 13 and 14. Fixed to the end of member 15 extending into the heating zone is a deflector 20 through the center of which passes member 15 providing passageway 18 with communication to the heating chamber. Deflector 20 is similar in cross sectional configuration to member 13 and is slightly removed from the inner ends of members 13 and 14. Thus, an accurately defined circumferential orifice 21 bounded by insert 19 and the gas distribution plate, on the one side, and deflector 20, on the other side, is formed. The width of this opening may be readily varied by a simple adjustment to the deflector which will be subsequently more fully described. As are all areas that are subjected to the high combustion and reaction temperatures, the deflector is constructed of a high temperature refractory material. The inner surface of the deflector facing circumferential orifice 21 and the gas distribution plate are both composed of heat resistant stainless steel. Thus, both parts may be maintained within close dimensional tolerances.

Extending through passageway 18 is a hydrocarbon feedstock member 22 having at its inner end nozzle or injector 23. This nozzle may take any form but is of such design as to direct the feedstock towards orifice 9 in a vaporized or atomized form. A nozzle structure found to be particularly satisfactory is one having a plurality of ports circumferentially and equidistantly spaced and so positioned with respect to the axis of conduit 22 as to extend at such an angle thereto as to give the spray and direction desired. The particular angle of these ports will necessarily be determined to some extent by the position of the deflector in the heating chamber, but usually will not exceed about 45 degrees.

Connected with passageway 18 and communicating therethrough with the heating chamber is means 24 for introducing an oxygen-bearing gas for supporting combustion, such gas hereafter being referred to as "axial air." In like manner, connected with passageway 17 and communicating through the open end thereof and through orifice 21 to the heating chamber is means 25 also for introducing an oxygen-bearing gas for supporting combustion, such gas hereafter being referred to as "process air." Connected with passageway 16 and communicating therethrough and through orifice 21 with the heating chamber is means 26 for introducing fuel. Entry of fuel from passageway 16 into orifice 21 may be by any means suitable for injecting it in a highly vaporized or atomized form so that a thorough mixing therewith of the process air will be obtained in the orifice. As shown in FIGURES 2 and 3, a particularly successful means of injecting the fuel comprises the heretofore described gas distribution plate provided with a plurality of circumferentially and equidistantly spaced ports 27, the axes of which are substantially parallel to the axis of the reactor.

In conducting the process of this invention process air is introduced through inlet 25 and passes through passageway 17 and is injected through the open end thereof into circumferential orifice 21. Simultaneously, a hydrocarbon fuel is introduced through inlet 26 and passes through passageway 16 and is injected into orifice 21 through ports 27. As the stream of process air flows radially outward passing ports 27, it is at its maximum velocity and minimum static pressure. As the vaporized or atomized fuel is injected into the stream at a controlled velocity, a thorough mixing of fuel therein is rapidly attained. The resultant fuel-air mixture flows radially outward following the contour of orifice 21 and is ignited as it passes into the heating zone. The burning mixture and its products of combustion continue to flow radially outward from the axis of the heating zone as a uniformly expanding disc towards the circumferential surface of the heating zone. It then follows a flow pattern as shown by the arrows in FIGURE 1, tending to flow parallel to said circumferential surface towards the opposite end of the heating zone where it is directed radially inward towards the axis of the zone and orifice 9.

As hydrocarbon fuel and process air are introduced into the reactor, through their respective inlets, hydrocarbon feedstock as a vapor or finely divided liquid spray is introduced through inlet 22 to be injected into the heating zone through nozzle 23. This injection takes the form of an expanding cone directed toward orifice 9. The temperature of the feedstock is rapidly raised as it approaches orifice 9 and is thoroughly mixed with and dispersed into the hot combustion gases resulting from the burning of the hydrocarbon fuel. The resultant mixture of combustion products and feedstock passes through the orifice into the reaction zone where the cracking of the feedstock is terminated as desired by quenching the mixture with water or other suitable cooling medium introduced through quench ports 5. The cooled reaction gas with entrained carbon black then exits from the reactor through an outlet opening not shown for subsequent separation and collection of carbon black by means which form no part of this invention.

Because of the circuitous path over which the hydrocarbon fuel-process air mixture is caused to flow, there is little if any contact within the heating zone between the mixture and/or its combustion products with the feedstock. Accordingly, substantially complete oxidation of the hydrocarbon fuel is attained with little or no loss of hydrocarbon feedstock through preferential reaction thereof with the oxygen of the process air. Nevertheless, the close proximity of the feedstock to the burning mixture has the decided advantage of causing a rapid temperature increase thereof through radiation of the intense heat of the burning mixture. In the process of this invention, moreover, the velocity with which the burning mixture is caused to follow the circuitous path is such as to create an intense turbulence. The result is a thorough and rapid diffusing of the feedstock in the combustion products accompanied by a rapid and uniform temperature increase to the cracking temperature.

In the description of the process to this point, the hydrocarbon feedstock has not been specified since there is no desire to restrict the process thereby. Any gaseous or liquid hydrocarbon may be employed. As used throughout the specification and claims, therefore, the term hydrocarbon feedstock is intended to mean generally any hydrocarbon. Thus, natural gas as well as heavier hydrocarbon oils from both petroleum and non-petroleum sources may be employed in the process of this invention. Such oils may contain any aliphatic hydrocarbon compound whether acyclic or cyclic, saturated or unsaturated or any aromatic hydrocarbon compound. The hydrocarbon fuel likewise may be varied and may be the same as or different from the hydrocarbon feedstock. Generally, however, the hydrocarbon fuel will be natural gas. The combustion supporting gas may be air, oxygen-enriched air, oxygen or the like, but generally for practical reasons, will be air. The amount of combustion supporting gas employed will vary depending upon the hydrocarbon fuel as well as the grade of carbon black being produced. The amount of oxygen employed in any particular case may be readily determined by one skilled in the art. Usually, the amount of oxygen employed will range from about that stoichiometrically required to obtain substantially complete combustion of the hydrocarbon fuel to as much as 125–150% of the stoichiometric amount. The predetermined amount of oxygen-bearing gas to be employed will, for the most part, generally be introduced to the reactor as process air with usually not more than about 8% being introduced through as axial air. Alternatively, all the necessary oxygen supporting gas may be supplied as process air.

The preferred reactor illustrated in the drawings, besides being particularly adapted for carrying out the process of this invention, has added features. As shown in FIGURES 1 and 2, the injector assembly 7 is provided with packing gland 28, packing nuts 29, guide rod 30, guide sleeve 31 and bracket 32 connecting the injector to the guide rod 30. It is apparent that the packing gland may be loosened by operation of the packing gland nuts so that the entire injector assembly may be moved to a new position, the guide rod and sleeve serving to maintain its true alignment within the reactor. Thus, deflector 20 may be readily positioned within the heating zone as desired. Similarly, circumferential orifice 21 can be readily adjusted in width from outside the injector by operation of adjusting nut 33. Accordingly, the velocity of the flammable mixture passing through orifice 21 may be varied without affecting the precise dimensional accuracy of the orifice which serves to uniformly distribute the flammable mixture as an ever expanding disc into the heating chamber. Still another feature of the preferred reactor is that the heating and reaction zones are independent structural units united at point 34 as indicated. Such construction permits for easy separation when it becomes necessary for one reason or another to replace choke ring 8. An added advantage of this two-piece construction, moreover, is that a very simplified fabrication procedure may be employed inasmuch as the steel shell 12 of each section may be placed on end, the corresponding refractory liner 10 accurately inserted and castable refractory insulating material 11 poured therebetween.

As previously stated, the process of the present invention may be conducted in reactors of designs other than that illustrated provided similar conditions are attained in the heating zone. Thus, the particular means for conducting the hydrocarbon feedstock as well as the hydrocarbon fuel and process air to the point of injection may take various forms. For instance, the process air conduit, if desired, may be such as to provide a secondary motion to the forwardly flowing stream of air, or the process air and hydrocarbon fuel may be conducted to the heating zone as a mixture through a single conduit. Similarly, the means for injecting feedstock, fuel and process air may take various modifications. The heating zone likewise may be of other configurations but will usually be of a generally tubular shape, although the relation of diameter to length may vary considerably from that shown. It is apparent, therefore, that various mechanical modifications may be readily arrived at without altering the essence of the invention and such modifications, even though not specifically illustrated or described, are intended to be included herein.

The process of this invention is further described by the following examples which are by way of illustration only and not limitation. Unless otherwise noted, all parts are by weight.

EXAMPLE 1

This example employs a reactor similar to that illustrated in the drawing. The heating zone has a diameter of 27 inches and a length of 7½ inches. The reaction zone is 18 inches in diameter and of 5 feet in length and opens into a quench zone through a choke ring of 9 inches inside diameter. The deflector is 10½ inches in diameter. The width of the orifice formed by the deflector and gas distribution plate is ¾ of an inch. The hydrocarbon feedstock is an aromatic distillate of the following analysis:

| | |
|---|---|
| Gravity API | 18.0 |
| Viscosity SUS @ 100° F. | 35.9 |
| Ash, percent | 0.0 |
| Carbon residue, percent (10% resid.) | 0.29 |
| Sulfur, percent | 0.59 |
| Aromatics, percent (ASTMD-1019-5612) | 59.0 |
| Aniline point, ° F. | 44.2 |
| Distillation, ° F.: | |
| IBP | 413 |
| 5 | 439 |
| 10 | 452 |
| 20 | 472 |
| 30 | 486 |
| 40 | 500 |
| 50 | 512 |
| 60 | 526 |
| 70 | 546 |
| 80 | 570 |
| 90 | 606 |
| 95 | 640 |
| E.P. | 670 |

The hydrocarbon fuel is natural gas with a heating value of 1095 B.t.u. cu. ft. The oxygen-bearing gas is air. The gas rate is 4,130 cu. ft./hr., air rate 64,000 cu. ft./hr. and feedstock rate 80 gal./hr. Reaction temperature is 2,400–2,750° F. Yield of HAF grade carbon black is 3.33 lbs./gal.

EXAMPLE 2

A sample of the above carbon black is compounded with rubber according to the following composition:

| Material: | Parts |
|---|---|
| Rubber SBR-1500 | 100 |
| Carbon black | 50 |
| Softener | 5 |
| Sulfur | 2 |
| Mercaptobenzothiazole | 0.8 |
| Diphenyl guanidine | 0.25 |
| Zinc oxide | 5 |
| Stearic acid | 1.5 |

The composition is cured for 40 minutes at 144.5° C. and then tested. Results, including Mooney viscosity, appear in Table I.

*Table I*

| | |
|---|---|
| Mooney viscosity at 212° F. (ML–4) | 70 |
| Shore hardness (30″) | 60 |
| Modulus at 300% (p.s.i.) | 1490 |
| Tensile (p.s.i.) | 3490 |
| Elongation at break (percent) | 590 |
| Angle abrasion loss/hr. (gms.) | 18 |

EXAMPLE 3

The procedure of Example 1 is repeated using a feedstock having the following analysis:

| | |
|---|---|
| Gravity API | 2.8 |
| Viscosity SUS @ 210° F. | 59.5 |
| Ash, percent | 0.0068 |
| Carbon residue, percent (10% resid.) | 9.729 |
| Sulfur, percent | 0.25 |
| Flash point, ° F. | 230.0 |
| Pour point, ° F. | 70 |
| Asphaltenes, percent | 2.0 |
| BMCI | 120.0 |
| Distillation, ° F.: | |
| IBP | 504 |
| 5 | 664 |
| 10 | 686 |
| 20 | 710 |
| 30 | 739 |
| 40 | 763 |
| 50 | 790 |
| 60 | 821 |
| 70 | 868 |
| 80 | 938 |

Gas rate is 5,420 cu. ft./hr., air rate 89,000 cu. ft./hr. and feedstock rate 120 gal./hr. Reaction temperature is 2,400–2,750° F. Yield of HAF grade carbon black is 4.24 lbs./gal.

EXAMPLE 4

The procedure of Example 2 is repeated substituting in the composition the carbon black of Example 3. Results appear in Table II.

*Table II*

| | |
|---|---|
| Mooney viscosity at 212° F. (ML-4) | 70 |
| Shore hardness (30″) | 62 |
| Modulus at 300% (p.s.i.) | 1740 |
| Tensile (p.s.i.) | 3265 |
| Elongation at break (percent) | 520 |
| Angle abrasion loss/hr. (gms.) | 13.55 |

EXAMPLE 5

The procedure of Example 3 is repeated using a gas rate of 2,850 cu. ft./hr., an air rate of 50,900 cu. ft./hr. and a feedstock rate of 51 gal./hr. Reaction temperature is 2400–2750° F. Yield of ISAF grade carbon black is 2.89 lbs./gal.

EXAMPLE 6

The procedure of Example 2 is repeated substituting in the composition the carbon black of Example 5. Results appear in Table III.

*Table III*

| | |
|---|---|
| Mooney viscosity at 212° F. (ML-4) | 67 |
| Shore hardness (30″) | 58 |
| Modulus at 300% (p.s.i.) | 1340 |
| Tensile (p.s.i.) | 3000 |
| Elongation at break (percent) | 520 |
| Angle abrasion loss/hr. (gms.) | 11.6 |

EXAMPLE 7

The procedure of Example 1 is repeated using a gas rate of 4,790 cu. ft./hr., an air rate of 72,700 cu. ft./hr. and a feedstock rate of 80 gal./hr. Reaction temperature is 2400–2750° F. Yield of ISAF carbon black is 1.94 lbs./gal.

EXAMPLE 8

The procedure of Example 2 is repeated substituting in the composition the carbon black of Example 7. Results appear in Table IV.

*Table IV*

| | |
|---|---|
| Mooney viscosity at 212° F. (ML-4) | 73 |
| Shore hardness (30″) | 60 |
| Modulus at 300% (p.s.i.) | 1590 |
| Tensile (p.s.i.) | 3020 |
| Elongation at break (percent) | 490 |
| Angle abrasion loss/hr. (gms.) | 11.2 |

I claim:

1. A process for preparing carbon black by thermal decomposition of a hydrocarbon which comprises: introducing a hydrocarbon feedstock through one end of a tubular heating zone and directing its flow therein along the axis thereof toward a reaction zone at the opposite end thereof; introducing a hydrocarbon fuel and a combustion-supporting oxygen-bearing gas into said one end of said heating zone and directing a flow of mixture thereof substantially radially away from said axis in all directions; igniting said radially flowing mixture whereby a uniformly expanding disc-shaped burning stream is formed, said burning stream being out of intimate contact with said flow of feedstock; changing the direction of flow of said radially flowing burning stream so that it flows substantially parallel to said axis and said flow of feedstock and toward said opposite end of said heating zone and then inwardly toward said axis and said flow of feedstock as it approaches said opposite end of said heating zone, whereby said feedstock is heated without intimately contacting said burning stream, and the combustion of said hydrocarbon fuel is substantially completed by the time said stream approaches said feedstock; intimately mixing said feedstock in the resultant stream of combustion products as they pass into said reaction zone whereby said feedstock is thermally decomposed to carbon black; and recovering carbon black.

2. A process according to claim 1 in which said radially flowing stream of hydrocarbon fuel and combustion-supporting oxygen-bearing gas at said one end of said heating zone is formed by separately introducing said fuel and said gas thereinto.

3. A process according to claim 1 in which said radially flowing stream of hydrocarbon fuel and combustion-supporting oxygen-bearing gas at said one end of said heating zone is formed by introducing thereinto a mixture of said fuel and said gas.

4. A reactor for producing carbon black which comprises: a tubular heating chamber provided with a circumferential wall and end walls, said heating chamber communicating through one of its end walls with a tubular reaction chamber; a hydrocarbon feedstock means for introducing feedstock into said heating chamber through the other end wall thereof and for directing its flow along the axis thereof toward said reaction chamber; a tubular member extending through said other end wall; a deflector mounted within said heating chamber and positioned from said tubular member so as to form with the end thereof a circumferential orifice radially communicating with said heating chamber; means for introducing a hydrocarbon fuel and a combustion-supporting oxygen-bearing gas through said orifice and into said heating chamber so that a mixture thereof flows substantially radially away from said axis in all directions as a uniformly expanding disc-shaped stream; and means comprising said circumferential wall and said end walls for directing the flow of said stream and the products resulting from the combustion of the hydrocarbon fuel toward said reaction chamber and substantially parallel to said axis and then inwardly toward said axis whereby said stream and said feedstock are intimately mixed as they enter said reaction chamber, the path of said stream as determined by the various said means being such as to permit substantially complete combustion of the hydrocarbon fuel before mixing of the stream and feedstock occurs.

5. A reactor for producing carbon black which comprises: a tubular heating chamber provided with a circumferential wall and end walls; said heating chamber communicating through one of its end walls with a tubular reaction chamber of substantially smaller diameter than said heating chamber; an opening in the other end wall of said heating chamber of substantially smaller diameter than the diameter of said heating chamber; a first tubular member extending through said opening; an additional tubular member extending through said opening substantially concentric to and of greater diameter than said first tubular member; an annular deflector carried by said first tubular member and having a diameter substantially the same as said additional tubular member, said deflector being completely within said heating chamber and positioned from the end of said additional tubular member so as to form therewith a circumferential orifice radially communicating with said heating chamber; means within said first tubular member for injecting hydrocarbon feedstock into said heating chamber along the axis thereof toward said reaction chamber; means for introducing hydrocarbon fuel and a combustion-supporting oxygen-bearing gas into said circumferential orifice whereby a mixture thereof is directed substantially radially away from said axis in all directions into said heating chamber as a uniformly expanding disc-shaped stream; said end walls and the circumferential wall of said heating chamber combining to subsequently cause the resultant radially flowing stream and the products resulting from the combustion of the hydrocarbon fuel to flow toward said reaction chamber and substantially parallel to said axis and then inwardly toward said axis, whereby said feedstock is heated without intimately contacting said stream and the combustion of said hydrocarbon fuel is substantially completed by the time said stream approaches said feedstock.

6. A reactor for producing carbon black which comprises: a tubular heating chamber provided with a circumferential wall and end walls; said heating chamber communicating through one of its end walls with a tubular reaction chamber of substantially smaller diameter than said heating chamber; an opening in the other end wall of said heating chamber of substantially smaller diameter than the diameter of said heating chamber; a first tubular member extending through said opening; second and third tubular members extending through said opening substantially concentric to and of greater diameter than said first tubular member; an annular deflector carried by said first tubular member and having a diameter substantially the same as said third tubular member, said deflector being completely within said heating chamber and positioned from the end of said third tubular member so as to form therewith a circumferential orifice radially communicating with said heating zone; a hydrocarbon feedstock injector positioned within said first tubular member for injecting hydrocarbon feedstock into said heating chamber along the axis thereof toward said reaction chamber; means for introducing a combustion-supporting oxygen-bearing gas and a hydrocarbon fuel distribution means for introducing a hydrocarbon fuel into said circumferential orifice, whereby a mixture of said gas and said fuel is discharged into said heating chamber flowing in a direction substantially radially away from said axis in all directions as a uniformly expanding disc-shaped stream; said end walls and the circumferential wall of said heating chamber combining to subsequently cause the resultant radially flowing stream and the products resulting from the combustion of the hydrocarbon fuel to flow toward said reaction chamber and substantially parallel to said axis and then inwardly toward said axis, whereby said feedstock is heated without intimately contacting said stream and the combustion of said hydrocarbon fuel is substantially completed by the time said stream approaches said feedstock.

7. A reactor according to claim 5 in which said hydrocarbon fuel introduction means is provided with a series of circumferentially spaced ports.

8. A reactor according to claim 5 in which the reaction zone is provided with a choke.

9. A reactor according to claim 5 in which the deflector has adjusting means for varying its position within the heating chamber along the axis thereof whereby the size of said circumferential orifice may be varied.

10. A reactor according to claim 5 in which the first tubular member has means for introducing a combustion-supporting oxygen-bearing gas thereinto for discharge through said tubular member and into the heating chamber along the axis thereof and toward the reaction chamber.

References Cited in the file of this patent

UNITED STATES PATENTS

| | | |
|---|---|---|
| 1,922,857 | Meachem | Aug. 15, 1933 |
| 2,216,508 | Zink | Oct. 1, 1940 |
| 2,564,700 | Krejci | Aug. 21, 1951 |
| 2,625,466 | Williams | Jan. 13, 1953 |
| 2,801,157 | Campbell et al. | July 30, 1957 |
| 2,865,717 | Krejci | Dec. 23, 1958 |

FOREIGN PATENTS

| | | |
|---|---|---|
| 735,968 | Great Britain | Aug. 31, 1955 |
| 738,346 | Great Britain | Oct. 12, 1955 |
| 786,730 | Great Britain | Nov. 27, 1957 |